April 16, 1963 C. O. CARLSON 3,085,469
OPTICAL INFORMATION-PROCESSING APPARATUS AND METHOD
Filed Oct. 12, 1959 3 Sheets-Sheet 2

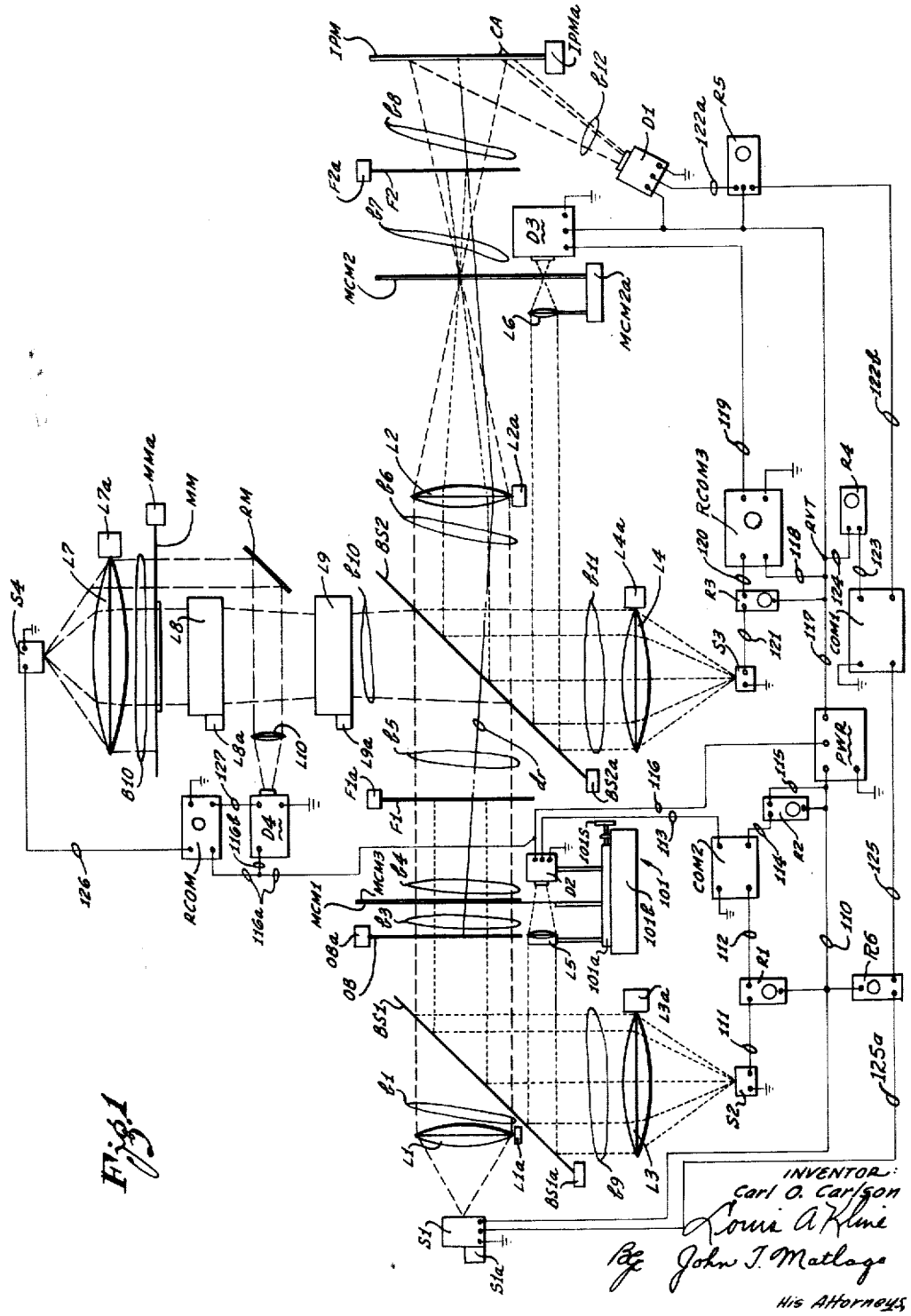

INVENTOR:
Carl O. Carlson
Louis A Kline
John J. Mallago
His Attorneys

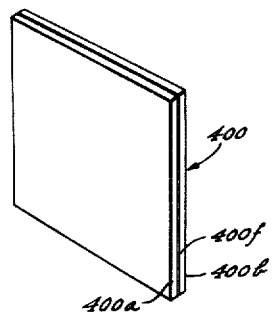
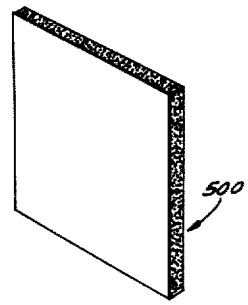
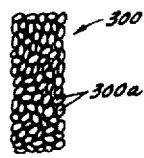
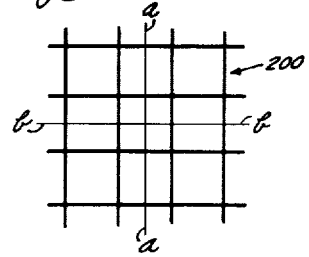
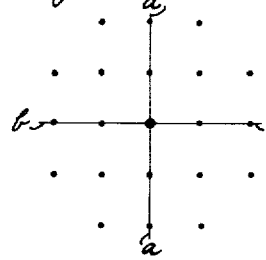
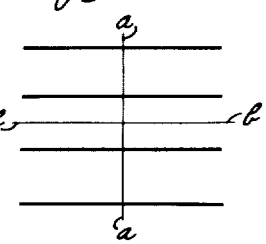
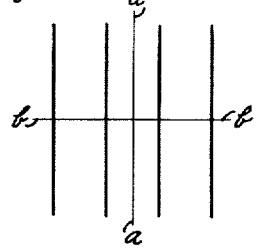
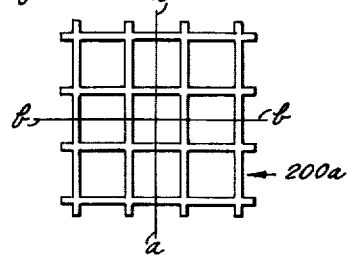

United States Patent Office 3,085,469
Patented Apr. 16, 1963

3,085,469
OPTICAL INFORMATION-PROCESSING
APPARATUS AND METHOD
Carl O. Carlson, Los Angeles, Calif., assignor to The
National Cash Register Company, Dayton, Ohio, a corporation of Maryland
Filed Oct. 12, 1959, Ser. No. 845,781
49 Claims. (Cl. 88—24)

This invention pertains to optical data- or information-processing apparatus and procedures, and more particularly to apparatus and procedures utilizing known principles of optical spatial filtering for the enhancement or other modification of optical images in such fields as photography, optical-character recognition, analogue computers and X-ray diffraction pattern analysis.

The analogies between mathematical representation and analysis of electrical wave phenomena by Fourier series, and the similar representation and analysis of diffracted waves in the "optical" portion of the electromagnetic wave spectrum, are discussed in the prior art. By "optical" portion of the electromagnetic wave (E.M.W.) spectrum is meant that portion including the ultraviolet (UV) and the infrared (IR) radiations. The term "light" as herein used will be similarly interpreted to include UV and IR radiations unless otherwise specifically limited. As shown by the prior art, study of diffraction phenomena by means of Fourier analysis has yielded interesting and useful knowledge and results, such as new modes of optical image enhancement and the like. The present invention, while obviously applicable in other fields, will be explained as applied to apparatus and modes for effecting optical information-alteration, such as changes in characteristics of a photoprint as are ordinarily secured by means of dodging, change of selection of contrastiness of sensitized paper, variation of illumination of the negative (object), and other like operations, the invention providing means and modes whereby such changes or alterations are effected by semi-automatic means or by manipulation of translatable controls such as dial knobs. Thus, in a sense of information-alteration operations as dodging and other image-enhancing operations are effected dynamically rather than statically, the operations being continuously variable over any desired duration interval. Other uses of apparatus and modes according to the invention will also be explained or made evident.

In an exemplary application of the concepts of the invention, filtering of spatial frequency components of an object-image radiation is effected by diffraction techniques, and image intensity and contrast are varied by varying the areal light-flux density over the image plane and by areally controlling the passage of information-containing or object-image-representing radiation by areal control of a means which in effect is an adjustable light valve. The latter comprises material disposed substantially in a plane or in a plane-faced device, and which material has object-image radiation-transmission characteristics that are variable in accordance with variations of independently applied auxiliary radiation. The material is such as to intercept and transmit only a portion of the object-image radiation when the material is subjected to the auxiliary radiation, and to pass more of the object-image radiation when not subjected to the auxiliary radiation. Further, the plane-faced device may comprise two of such materials, each activated or rendered effective by a different auxiliary radiation. Alternatively, a second type of material may be used in either of the previously mentioned arrangements. This second type of material is such as to intercept and transmit only a portion of the object-image radiation when the material is subjected to a primary auxiliary radiation of one waveband, and such as to transmit a large percentage of the object-image radiation when or after the material is subjected to a secondary auxiliary radiation of a waveband not included in either of the other radiations. Specific examples of materials of both mentioned classes are hereinafter disclosed. Thus, by suitably varying the intensity and/or areal distribution of the auxiliary radiation over the plane of the material, desired alteration of the information-containing or object-image radiation transiting through the material may readily be accomplished. In this way, the intensity of the transmitted light impinging upon a device at the object-image plane may be varied, both in respect of time, and in respect of different areas in the image plane, and the information contained in the object-image radiation prior to transmission through the material altered, either by areal-intensity variation (dodging), by spatial filtering (e.g., for image-outline variation), or by both. Further, as hereinafter made more fully evident, such variations may be effected in response to servo control or feed-back means which are responsive to the illumination at an object-image, or printing, plate. Also, servo control means are provided for maintaining constant at a desired manually-adjustable intensity-level the auxiliary radiation supplied by each source of that type of radiation when such action is desired; whereby certain ones of the alterations of the information are, or may be selectively, automatic. Materials of the above mentioned types are hereinafter referred to as metachromatic materials (hereinafter abbreviated: MC materials), by which is meant, materials whose radiation-transmission characteristics are controllably variable and are reversible due to natural "decay" or to decay induced in response to variations of applied radiation such as heat and/or light. Such MC materials include, for example, elementary and complex spiropyrans, and derivatives. Preparation of a suitable one of such materials, and inclusion thereof in a suitable medium, may be effected according to procedures hereinafter explained. Specific examples of exemplary classes of MC materials are also set out hereinafter in this description.

Alteration of optically-represented information (such as image-enhancement, image-outlining, partial image-degradation, and the like), may be effected according to the illustrated embodiment of the invention by utilizing means including some of the aforementioned MC material, such material being disposed in part in the focal plane of a projection lens to which the information-containing beam of light is supplied, the material there disposed being effective to produce controllably dynamic spatial filtering effects; and selective change-of-contrast as a function of object-contrast, and like alterations, may be secured by disposing the MC material adjacent the object whose image is to be altered and in the beam of light modified by the object. For example, selective change of contrast in photo reproduction is attained by disposing a film containing MC material beyond but substantially in contact with the plate or negative of which a reproduction is to be made, and suitably exciting the MC material with auxiliary radiation passed through the negative. This simple example will be explained hereinafter in greater detail.

It is, then an object of the invention to provide an improvement in optical information-processing systems.

Another object is to provide means for effecting desired alteration of information contained in light traversing a light-path.

Another object of the invention is to provide a system for dynamically effecting optical-image alteration.

Another object is to provide an improved photographic projection system.

Another object is to provide means for automatic predeterminable correction of information contained in light traversing a light-path.

Another object is to provide an improved method of altering information comprised in a beam of light.

Another object is to provide means for aiding in interpretation of information stored in photographic records.

Another object is to provide an automatic optical spatial filtering system.

Other objects and advantages of the invention will be made apparent hereinafter or become apparent from consideration of the appended claims and the following description of a preferred illustrative embodiment of physical apparatus incorporating the principles of the invention, said description including as an adjunct the accompanying drawings in which:

FIG. 1 is a schematic electro-optical diagram depicting optical and electronic elements of an exemplary apparatus according to the invention, using conventional symbolism for optical elements and depicting other means in schematic block-diagram style;

FIG. 2 is a view of one type of device comprising metachromatic material;

FIG. 3 is a view of a second type of device comprising metachromatic material in encapsulated form;

FIG. 3a is a view of a portion of the encapsulated metachromatic material included in the device shown in FIG. 3, greatly magnified to indicate the physical nature of the structures enclosing the material and providing a unitary device;

FIG. 4 is a view illustrating the nature of an open-mesh grid such as a screen or the like useful in explaining aspects of the invention, and also illustrating an optical image of such a grid or screen; and FIGS. 4a, 4b, 4c and 4d are views illustrating diffraction patterns produced under specified conditions when using the grid screen of FIG. 4 as an object.

Figure 1A:
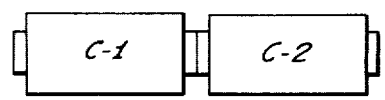
FIG. 1a is a block diagram illustrating cascading of basic apparatus arrangements according to the invention.

Referring to FIG. 1, there is indicated at S1 a light-source means. This means may be selected to be of the type known in the art as a "point" light source, or a slit source, or a source with a two-dimensional aperture, depending upon the end result to be attained by the system and/or the mode to be followed in operation of the system. Further, as hereinafter indicated, source-means S1 may be a "pulsed" source providing radiation of extremely high intensity intermittently. In general, and in this example, a point source will be assumed. Further, the radiation derived from or furnished by S1 may be selected to be monochromatic, or restricted to a particular "wide" frequency band of the optical portion of the electromagnetic wave spectrum, or it may be "white" light, again depending upon the end result desired to be attained. Radiation from source S1 is refracted by a lens means L1 into a beam indicated by dash-line rays through the loop indicated at b1. In general, (the simplest case), S1 will include a source of light located at the focal point of L1, to provide a collimated beam b1 into which beam information is to be entered or admitted. In an elementary system according to the invention, the radiation in beam b1 is directed onto an object-means OB, which may for example, comprise as an object a photo-transparency, the light transmitted therethrough forming an information-containing beam indicated by b3. The directly-transmitted radiation comprised in beam b1 is modified or altered in ways hereinafter explained and a resultant beam, indicated by b6, is refracted by a lens means L2. L2 brings the radiation in beam b6 to a focus in a focal plane at which is disposed means labeled MCM2; and the radiation transiting MCM2 is displayed on image-plane means IPM, as indicated. If, with the stated elements disposed as indicated, a means provided with an edge is disposed in beam b1 as an object-means OB, the beam will be altered or modified by removal of some of the rays thereof, and diffraction will occur at the edge. The diffracted light is composed in a diffraction pattern which is characteristic of the means (an object, a slit, an aperture, etc.) which caused the diffraction. The types of diffraction patterns produced by various kinds of apertures, object, etc. are known in the art and are treated in standard texts devoted to the subject of optics. In the briefly described system of devices including a diffracting object at OB, a portion only of the diffracted radiation (such as ray $dr$) will be intercepted by lens means L2 and projected through the focal plane at MCM2 and onto the imaging means, IPM. Thus, lens means L2 forms a limiting aperture for the diffracted radiation from OB, and secondary diffraction occurs. In the present simple example this secondary diffraction is neglected and not utilized; however, it determines the limiting resolving capabilities of lens L2, and in other aspects and application of the invention is utilized.

If a pair of like objects disposed in parallel relationship were used as the diffracting object means in this explanatory example, the pair would have similar diffraction patterns, except for phase, and the diffraction patterns would be superimposed. Similarly, the diffraction patterns of many like objects similarly disposed, superimpose to form a single pattern which though characteristic of any single one of the objects, contains additional interference structure due to phase cancellation and reinforcement. Thus, the diffraction pattern corresponding to a grid of opaque lines or a mesh of wires or the like (such as is depicted in FIG. 4 and designated 200) is shown on corresponding axes $aa$—$bb$ in FIG. 4a, and the fundamental pattern is the same irrespective of the number of the wires. However, an increase in the number of wires produces an increase in intensity and reduction in the size of the diffraction pattern spots. The diffraction pattern, as restricted by the aperture formed by lens means L2, may be viewed on a screen interposed in the focal plane of lens means L2. With such temporary viewing screen removed, the image of the mesh is produced on IPM, and appears substantially as indicated in FIG. 4. Now if the radiation transiting through the focal point of lens means L2 be left undisturbed, and all but the central vertical line portion of the diffraction pattern be blocked out at the plane of MCM2 (as by using a thin sheet of opaque material having a vertical slit and disposed in the focal plane to pass radiation through the focal point), vertical line portions of the image of the mesh as viewed at IPM vanish, leaving only the horizontal lines (FIG. 4b). Similarly, if all but the central horizontal portion of the diffraction pattern is blocked out at MCM2, the horizontal line portions of the mesh image at IPM disappear (FIG. 4c). Now if only the central spot (at the focal point of L2) is blanked out, only the outline of the mesh image at IPM remains (FIG. 4d). Thus, it is evident that by suitably operating upon the diffracted and/or directly-transmitted radiation at MCM2, various types of alterations of the produced image at IPM may be effected relative to the object-means OB. As specific example, if OB were an ordinary photo-negative, and all but the center horizontal-line section of radiation passing at MCM2 were removed, the vertical line portions of the image produced at IPM would be accentuated relative to the horizontal line portions; and if only the central point in MCM2 were blanked off, only the outlines of the image would appear at IPM. This latter constitutes outline enhancement by spatial filtering. These effects, which involve removal of certain frequency components of the Fourier transform of the wave energy at the diffraction plane (MCM2), are utilized in the present invention. Further information concerning spatial filtering phenomena is found in the prior art literature including the paper "Spatial Filtering in Optics" by E. L. O'Neill, published in June 1956, in the "IRE Transactions on Information Theory" at pp. 56–66, the references therein cited, and Research Paper 2672 of the National Bureau of Standards (Vol. 56, No. 5, May 1956 issue of NBS Journal of Research); and reference thereto may be made if necessary to an understanding of the known features of the phenomena.

According to one aspect of the invention, there is interposed at the focal plane of lens means L2 a controllably variable optical spatial filter means MCM2. This latter means comprises a metachromatic means, which means may comprise a film comprising MC material, or other similarly-acting means hereinafter described. The MC material may be one or more of a family of optically-reactant spiropyrans, or one or more of a family of derivative thereof, both of which groups of materials are hereinafter more fully exemplified and disclosed. One characteristic of MC materials is, as is indicated by the name, change of color-state (metachromatism) in response to change of incident radiation. The particular material or materials selected will depend upon the end result desired, as will be more fully herein explained. In the case of photo-outline-enhancement, the material may be selected from those MC materials having either slow or rapid decay properties; and for certain photo-interpretation operations (especially those wherein OB is a moving device or wherein special effects are desired), the material should be selected from those having a rapid decay rate. The term decay as herein used means the diminution of light-attenuating properties following extinction of auxiliary exciting radiation applied to the material. This will become fully clear and evident as the description proceeds. Beyond MCM2, that is, on the side of MCM2 opposite from source-means S1, there preferably is situated a filter means F2 whose purpose and effect is to remove all or a selected part of an auxiliary-radiation supplied to MCM2 to control the color (radiation-transmissivity) of the latter. Information in beam b3, modified by means MCM2, is intercepted and displayed on object-image-plane means IPM. In a simple apparatus means IPM may be a viewing-screen, or, alternatively, a photosensitive film or paper, depending upon the operation being performed and the end result desired.

Assuming, for example, a point source of light at S1, and a photo-negative at OB, the diffracted image of that source, diffracted by passing through a photonegative at OB and through lens L2, will be formed in the plane of MCM2, that is, at the focal point of lens means L2. Spatial filtering of the diffraction pattern can there occur, such filtering being controllable by controlling the spatial configuration, transmissivity and nature of the device MCM2. Thus, it is evident that if the transmissivity of MCM2 is varied uniformly or differentially, the extent of spatial filtering of information-representing radiation incident on the device MCM2 is correspondingly varied. Such variation of the transmissivity of MCM2 may be easily accomplished by variation of an auxiliary radiation applied to a plane-faced device or film containing metachromatic material and disposed in MCM2. This auxiliary radiation may be supplied, for example, by means including an optical radiation source means S3, lens means L4, and beam-splitter means BS2, arranged as indicated. The auxiliary radiation thus utilized for varying the transmissivity of the metachromatic material in MCM2 is, as previously noted, preferably (but not necessarily) removed by filter means F2 which is substantially opaque to the auxiliary radiation but transparent to at least the desired portion or portions of the wave spectrum in which the information-containing light exists. More detailed explanation of the thus briefly described apparatus will be made hereinafter.

According to a second aspect of the invention, in which a principal end result or object is to obtain automatic areally-variable and temporarily-variable dodging effects in photo reproduction, means S1 comprising a source of primary radiation is again provided, the radiation from which may include any desired portion of the optical spectrum and is collimated by lens means L1 into a beam b1 which passes through a beam-splitter means BS1 and is incident upon object-means OB which in this example, would include a photo-negative. Thus, the radiation beam b1 from S1, transiting means OB, is converted into an information-containing beam b3 in which the information is comprised in the areal distribution of radiation-intensity and/or frequency in a cross-section of the beam. For altering the contained information by changing relative radiation-intensities of various areas of the beam cross-section, whereby to obtain dodging effects, beam b3 is directed through a film or cell means containing finely dispersed metachromatic material, this being comprised in this example in means designated MCM1. Detailed descriptions of each of a plurality of types of means MCM1 are hereinafter set out; but in each case a metachromatic material in means MCM1 serves functionally to change relative intensities of information-radiation, areally, in beam b3. The metachromatic material is preferably disposed in close juxtaposition with respect to the transparency or plate in means OB, but may be spaced away therefrom any selected distance to produce special effects. This variation in spacing may be effected by suitable means such as a device 101 which includes a base 101b on which is slidably mounted a slide 101a which carries, inter alia, a support for means MCM1 and which slide is translatable on base 101b by adjusting-screw means 101s. Means MCM1 is in FIG. 1 shown displaced away from means OB, solely for convenience in illustration of the more general case, it being understood that MCM1 may be moved to position the metachromatic means or material in contact with the object transparency or plate at OB.

Variation of the relative areal intensities of radiation in beam b3 by the metachromatic material in MCM1 is effected by varying the transmissivity of areas thereof to information-containing light, by variably irradiating or exciting the MC material with an auxiliary radiation supplied by a source means S2 and transmitted to means MCM1 by way of means including lens means L3, beam-splitter means BS1 and object-means OB. Preferably the arrangement is such that the auxiliary radiation is collimated with the primary radiation of beam b1, as indicated. The auxiliary radiation is of a waveband at least a major portion of which is not included in the waveband of the radiation comprised in beam b1. Further, the auxiliary radiation is selected according to the particular metachromatic material in MCM1 so that the auxiliary radiation is areally varied by the areal variations of transmissivity of the object means and, impinging on the metachromatic material excites the latter to an extent directly dependent upon how much of the auxiliary radiation is transmitted by the object means. As an example, the auxiliary radiation is in the UV portion of the E.M.W. spectrum, the appropriate MC material has high sensitivity to UV (and becomes absorbent to light of the "visible" portion of the E.M.W. spectrum when exposed to UV), said the material is relatively or completely insensitive to radiation from source means S1. The latter radiation in this example may be "visible" light. Thus, in the exemplary assembly of apparatus illustrative of the second aspect of the invention, darker or denser areal portions of an object photo-negative at OB will transmit a lesser percentage of the UV radiation than will less dense or lighter areal portions, and as a result those areas of the metachromatic material next-adjacent to (or superposed on) the darker areas of the negative will be less excited by UV radiation and will transmit more of the primary radiation incident thereon than will those areas which receive a higher intensity of UV radiation through the less dense areas of the photo-negative. It is apparent, then, that the more highly excited areal portions of the metachromatic means in MCM1, reducing the percentage of the primary radiation passed therethrough (while the less excited areas transmit a higher percentage), serve to reduce the contrast between "dark" and "light" areas of the object image as viewed in image plane means IPM, relative to the contrast in the photo-negative.

The light of beam b3 thus containing the information imparted to it by the photo-negative in OB is converted by the metachromatic material in MCM1 into a beam b4 which contains the information as modified by the metachromatic material. In this case, beams b3 and b4 comprise a component of UV radiation. The latter is in the present example of no value in beam b4 (having served its purpose in exciting the metachromatic material), and accordingly is preferably removed by means such as a filter means F1 which is relatively transparent to the light from source means S1. Thus beam b5, beyond filter means F1, is substantially the same as the information-containing component of beam b4. The projector-lens means L2 brings beam b5 to a focus at its focal point (at which is imaged the light-source in S1), and the information imparted to beam b1 by means OB but as modified by MCM1, is displayed on a means such as photosensitive film or paper in means IPM. In this particular example in which only change of contrast of the image relative to the object transparency is desired, beam-splitter means BS2, means MCM2, and filter means F2 are not essential to the operations and may optionally be removed. It is evident that if more advanced types of spatial optical filtering (as for image-outline enhancement, for example) are desired in addition to change-of-contrast, then the aforementioned means including S3, L4, BS2, MCM2 and F2 may be employed in the manner previously indicated, source means S3 supplying UV radiation and filter means F2 removing the UV from the beam b7 prior to object-image formation at means IPM.

In the preceding exemplary operation wherein the desired change in contrast was a preferential reduction of contrast of projected image relative to object means, the MC material was such as to be rendered less transmissive of primary radiation from S1 by incident radiation from source means S2. The opposite effect, that is, increase of contrast, may be obtained by employing in and at MCM1 an MC material which is rendered more transmissive of radiation from source S1 when excited by either or both of radiations from S1 and/or S2, it being only necessary to use an MC material having fast decay and to apply to the reverse face of MCM1 a second auxiliary exciting radiation which tends to render the MC material less transmissive of S1 radiation. Such second auxiliary radiation may be provided by a source means S4 and directed to the reverse side of MCM1 by way of lens means L7 and beam-splitter means BS2. Filter means F1 may either be removed, be placed between BS2 and L2, or, if left in position, be constructed to be relatively transparent to exciting radiation from S4. In this mode of operation, the MC material in MCM1 is excited toward the non-transmissive state (relative to S1 radiation) by the second auxiliary radiation from S4, substantially uniformly over the reverse side of MCM1; and at the same time the radiation from source S1 and/or the radiation from source S2 "erases" the exciting effect of S4 radiation to a degree dependent upon the percentage of the erasing radiation that passes through OB. Thus, over dense areas of an object negative relatively little of "erasing" effect will be noted while over more transparent areas the erasing effect will be considerable; and the net result is a reduced transmission of radiation from S1 through MCM1 via dense areas of OB, and a relatively increased transmission via the lighter or less dense areas, whereby contrast is accentuated in the optical image produced at IPM.

In the contrast-accentuation process explained in the preceding paragraph, apparatus including source means S4, lens means L7 and the beam-splitter means BS2 are used, and these means are provided as indicated in FIG. 1. It is evident that if the contrast-accentuation (or the previously explained contrast-reduction) is desired over only a portion of the areal extent of the object means at OB, a mask means MM may be provided which will be effective to mask off the S4 auxiliary radiation from the areas of MCM1 which cover the area of OB whose contrastiness (degree of contrast) is to be left in status quo. Further, if varying degrees of contrast-alteration are desired over particular areas, mask means MM may be of the nature of a photo-negative or photo-transparency produced to provide the proper areal modulation or variation of the excitant radiation from source means S4. Also, other modes of varying the areal extent and degree of excitation of the MC material in MCM1 may be employed, as will hereinafter be made apparent in an explanation of other features of the invention.

Means for varying the extent or magnitude of the spatial filtering effect produced at MCM2, and, similarly, means for varying the contrast-variation effect produced at MCM1, are provided. Further, the means for effecting these variations is chosen for both a manual adjustment and an automatic adjustment, in each case, whereby a desired level of contrast-change (and/or a desired level of spatial-filtering) may be manually brought about, and those levels automatically maintained throughout a period of operation despite light-source intensity changes and/or change of object means. Additionally, provision of manual control means permits rapid manual variation of at least one or two of the variables entering into the information-alteration, whereby some meritorious results may be secured in dynamic photo-interpretation operations. This will hereinafter be explained in greater detail. Considering first the means for effecting variations in the effectiveness of the metachromatic material in MCM1 as a "light valve" or spatial selectively-variable transmitter of primary radiation from source means S1, source means S2 is supplied power from a closely-regulated power source PWR by way of a power lead 112, a regulator means R1 and a lead 111. Regulator means R1 is provided with manually operable means such as a potentiometer, and also means responsive to a regulating potential appearing on a lead 112, for manually setting and automatically maintaining the power supplied to lead 111 at the level necessary to cause source means S2 to supply light of constant intensity at a desired and determinable value. The regulating potential appearing on lead 112 is supplied by a comparator means COM2 which is provided by way of a lead 113 with a potential representing the intensity of the auxiliary radiation from source means S2 as detected by a photo-electric detector means D2. The comparator means COM2 is also supplied with an adjusted-level standard potential on a lead 114. A manually adjustable regulator R2 is supplied power at a constant potential from source PWR via leads 110 and 115, and serves to supply the adjusted standard potential to COM2 comparison purposes. Comparator means COM2 is a conventional means and may be a difference amplifier of the type disclosed in pp. 146, et seq. of the text "Electron-Tube Circuits," by Samuel Seely (McGraw-Hill, New York, N.Y.), and explained also in pp. 161, et seq. of the text "Electronic Engineering," by the same author and publisher. Power for detector means D2 is supplied from source PWR by a lead 116; and as indicated, the detector means is supplied a continuing sample of the radiation output of S2 by way of beam-splitter means BS1, lens means L5, and MCM1. Thus, any desired intensity level of auxiliary radiation may be selected by manual manipulations of regulator means R1 and R2; and thereafter the servo or feed-back means comprising detector mean D2 and comparator means COM2 will maintain the intensity at the selected level. Thus, any desired degree of change-of-contrast may be maintained for a series of interchangeable photo-transparencies or object means, or during a series of other information-altering procedures effected with respect to a particular object-transparency.

In a similar manner and by similar manually-adjustable servo means, the intensity level of auxiliary radiation supplied by the aforedescribed source means S3 may be set at a desired value and maintained constant, whereby a desired degree of image-outline enhancement, for example, may be maintained. These servo control or feedback means include radiation detector means D3 which are supplied via lens means L6 and MCM2 a specimen of the S3 auxiliary radiation reflected by the lower surface of beam splitter means BS2, and also include regulator-comparator means RCOM3, which includes functions equivalent to R2 and COM2, manually adjustable regulator means R3, and electric leads 117, 118, 120 and 121 disposed and connected as indicated. This servo control or feed-back apparatus operates in manner similar to that explained in connection with source means S2.

A sub-system of means is also provided whereby a desired areal radiation-intensity or illuminance level may be maintained over all or any selected portion of the photo-active part of IPM, whereby desirable end results, such as uniform exposure-time for successive photo-prints from corresponding different photo-transparencies or negatives of differing average "densities" may be attained. That sub-system of means includes a movable or variable light-responsive detector means D1 arranged to receive reflected radiation from all, or, by adjustment, from only a desired portion, of the photo-active part of IPM. A potential whose magnitude bears a determinable relationship to the average areal intensity of reflected radiation received by detector means D1 is applied via lead 122a, adjustable regulator R5, and lead 122b to comparator means COM1. The latter comparator means is supplied a manually adjustable standard reference potential by a regulator means R4, via lead 123. Means R4 is supplied power from regulated source PWR by way of lead 117, reference voltage terminal RVT and lead 124, and includes manually operable means for presetting the comparison potential appearing on lead 123, at a desired level. Means D1 is supplied power from source PWR by way of lead 117, as indicated. The output signal or potential of the comparator means COM1 is transmitted to source means S1 via lead 125, R6 and lead 125a. By positional adjustment of detector means D1, and/or by entrance-aperture restriction, that detector means responds to only radiation reflected from a selected areal extent of the optical image or pattern produced on IPM by the radiation comprised in beam b8; and through the afore-described servo or feed-back means including the detector D1, COM1, etc., serves to vary the intensity of radiation produced by source S1 so as to maintain substantially uniform the average areal intensity of radiation sensed by D1. The servo or feed-back system schematic diagram for this apparatus system is shown in FIG. 1b, wherein the light-beam links are indicated in dotted lines and the electronic links are shown in full line form. Construction of this part of the apparatus is according to known principles such as are set out in the texts, "Control Engineers Handbook", by Truxal, section 2 (Mc-Graw-Hill, New York, N.Y.); and "Servomechanisms and Regulating System Design", by Chestnut and Mayer (John Wiley & Sons, New York, N.Y.). It is evident that detector D1 may be controlled in action by being restricted to view only a "control" area at IPM, the brightness at which is in turn controlled by a control area on a photo-negative at OB. Such a control area may be a precisely located spot of determined optical density on a negative, in which case detector means D1 is adjusted to detect radiation reflected from the corresponding control area CA at IPM. The application of this sub-system of apparatus exemplifying one aspect of the invention, to study and/or analysis of optically-represented information as modified by metachromatic material or mask means or aperture means located at the focal point of lens means L2, is thought to be obvious.

In the aforementioned elementary system of apparatus in which metachromatic material in MCM1 is subjected to radiation from source S2 and acts as a "light valve" to pass primary radiation from source S1 in inverse proportion to opacity of areal portions of a transparency in OB, it will be evident that as the metachromatic means is moved away from contact with the transparency, the gradation to contrast between next-adjacent areas is made more gradual in the image at MCM1 than it would be with the metachromatic means in closer proximity to or in contact with, the transparency. Thus, degradation of the degree of sharpness of contrast of the image at MCM1 relative to the object means OB may be varied by varying the position of MCM1 with respect to OB. This produces varying degrees of image edge enhancement at IPM as well as "dodging." Further, in either an elementary system including "dodging" operations, or a system for effecting image-enhancement by spatial filter action of spatial filter means (slit, shaped aperture, metachromatic material, etc.) at the focal point or focal plane of lens means L2, several additional operations or modifications in the information-alteration process may be effected. For example, considering one type of information to be stored in a transparency, in the form of lines in patterns, the information may be mathematically operated upon by using operating means such as an "optical wedge" type of beam-splitter at BS1. That is, there is used at BS1 a semi-transparent mirror whose transmissivity is not areally uniform but varies according to the mathematical operation to be performed. For example, the transmissivity can readily be made to be uniformly decreasing from bottom to top or from center to periphery of the beam-splitter, whereby to effect an obvious functional operation upon the information. Similar results may be secured by using mask means in the path of the light in beam b9. Obviously, too, in a system utilizing information-alteration effected by and at MCM1, there may be interposed at the focal plane of lens means L2 a means in the form of a focal-point mask, or a means having a slit-aperture, a rectangular aperture, or a circular aperture; whereby to secure spatial filtering according to a prescribed Fourier transform.

In a more complex system according to the invention and illustrated in FIG. 1, the information-altering means positioned next-adjacent to or in contact with object-means OB, comprises two metachromatic devices or means, preferably but not necessarily placed in back-to-back contacting relationship and each responsive to a different set of auxiliary radiation wavelengths and/or having different response and decay characteristics whereby each such MC means performs a different individual operation upon the information in beam b3. As illustrated, two metachromatic means such as films each comprising differently excited metachromatic materials, and designated MCM1 and MCM3, respectively, are mounted together to be moved with slide 101a. The metachromatic material in MCM1 is excitable, as previously noted, by auxiliary radiation of beam b9 from source means S2 (as modified by BS1 and OB); and the metachromatic material in MCM2 is excitable by a different band of auxiliary radiation supplied in a beam b10 from a source means S4 and applied to MCM3 by way of lens means L7, mask means MM, lens L8, lens-and-aperture means L9, and beam-splitter BS2. Radiation from source means S4 and the metachromatic material in MCM3 are selected such that the auxiliary S4 radiation is passed by filter means F1 and is relatively ineffective with respect to the metachromatic material in MCM1. Alternatively, F2 may perform the function of F1 in certain cases. In this more complex system source means S1 may supply monochromatic radiation or radiation comprised in a limited waveband portion of the visible portion of the *emw* spectrum, while source means S2 may supply UV radiation and source means S4 may supply IR radiation or radiation comprised in a portion of the visible portion of the *emw* spectrum not comprised in the radiations from source means S1 and S2. These relationships are, however, exemplary only, it being deemed to be evident that it is only necessary that the metachromatic materials, the radiations, and the filter and object means be selected to be compatible with a minimum amount of objectionable cross-interference, and selected with the final end result at IPM in view.

In the more complex system briefly described in part in the preceding paragraph, manually adjustable servo means are preferably provided whereby the effective level of action or effect of MCM3 on the information-containing radiation transiting MCM2 may be selected, and maintained automatically at the selected level. The servo means for this purpose comprises a detector means D4 supplied with power from source PWR by way of a branch lead 116b connected to branch 116a of lead 116, and further comprises a regulator-comparator means RCOM which is supplied power by way of lead branch 116a as indicated. That regulator means regulates power transferred therethrough to source means S4 by way of a lead 126. Detector means D4 is supplied a specimen sample of the radiation comprised in beam b10 from source means S4, by way of a mirror means RM and a lens means L10 relatively transparent to the mentioned radiation, the several means being disposed as indicated. The detector means D4 supplies on a lead 127 an output signal representative of the intensity of radiation in beam b10, and regulator-comparator RCOM utilizes that signal to regulate the power supplied through a manually adjustable circuit to lead 126 and source means S4, whereby the intensity of radiation in beam b10 is automatically maintained at a pre-selected level. In either of the previously described apparatus arrangements according to the invention, the positions of the respective auxiliary-radiation source means ($S_2$, $S_3$, $S_4$) relative to their respective collimating lens means ($L_3$, $L_4$, $L_7$) are variable, whereby the "dodging" and other information-altering effects may be shifted or otherwise varied with respect to the respective metachromatic means and hence also with respect to different areas of the object-image at IPM. This relative shifting of radiation-source means and optical elements of the system can also be accomplished by physical movement of lens means, or by movement of object means or metachromatic means, as is thought to be obvious. Similarly novel results are obtainable by rapid insertion and removal of certain of the optical elements, and in some cases by rotation of optical elements. And it is evident that if, for example, one auxiliary-radiation source means is effectively disposed when in a first positional arrangement to perform one type of information-alteration and when in a second arrangement to not perform that type of information alteration (or to a lesser extent, or to perform none at all) and is intermittently shifted from either positional arrangement to the other and back, then a second one of the auxiliary-radiation source means may be oppositely shifted, in unison with the first, effecting a time-sharing of the two respective types of information-alteration. An object-image at IPM may thus be so varied with respect to time as to appear to "breathe," and shifting from one configuration to another and back, whereby valuable photo-interpretation data may be obtained. It is evident that this technique may be varied not only in a temporal sense, but also in respect to image color-components (by using white light in S1 and color-transparency means in OB and differing types of metachromatic radiation-absorbing means in MCM1, MCM3, MCM2, for example), for the accentuation and study of certain color-components of an object-means. Also it is evident that, rather than shifting the auxiliary-radiation source means (such as S2) relative to its respective lens means (such as L3), other elements of the optical system may be moved. For example, lens means such as L3 or L4 may be mounted in cam-oscillated mount means, or the beam-splitter means such as BS1, BS2, may be similarly oscillated. Or, to secure another useful image-examination result, the means at OB may be shifted transversely relative to the optical axis of beam b3. Still another useful result is attained by rotation of a slit means comprised in the apparatus at MCM2, the rotation being effected about the optical axis. The means for effecting the shifting of elements of the system relative to other elements thereof are not shown in detail in the drawings in the interest of clarity of the ilustrations and since they are, per se and alone, not of this invention. Such means may be of known form and are considered to be included in and represented by the respective blocks or rectangles bearing the ordinal designation of the principal means with the added subscript "a." Additionally, it is evident that mask means may be interposed in the respective auxiliary-radiation beams, whereby additional changes in the end results at IPM may be obtained. These additional means are also not illustrated in FIG. 1, in the interest of clarity of illustration.

In the described systems, high frequency peaking of the object-image brought to a focus at the focal point of lens means L2, is attained by virtue of the diffraction produced by the slit, shaped aperture, or metachromatic, means disposed in the optical system. The image-outline enhancement by partial or complete suppression of low frequency components of the Fourier transform produced by diffraction is of value in photo-interpretation by bringing out the definitive features of the object-image while suppressing the components of the image which are of less consequence to definition.

In those applications of the invention in which relatively slow erasure (decay from colored state to translucent state) of the MC material may be tolerated, the MC material may be selected from among those which are excited to the colored state by UV light, or those that are naturally stable in the colored state but which may be "erased" by application of IR radiation. Also, in those applications of the invention in which the metachromatic means comprises two cells or films (MCM1 and MCM3) of differing characteristic, one MC material may be of one color and the other colorless (when excited), and the two of such characteristics that a "neutral density" is the result of transmisison therethrough of light from a source, whereby by varying excitation of one MC material relative to the other the transmission of light from a means at OB may be increased or decreased. Thus contrast may be selectively increased or decreased. Suitable mask means may be used with either or with both of the MC material exciting sources (auxiliary sources) to permit some areas to have increased contrast while simultaneously other areas have decreased contrast. Further, valuable photo-interpretation effects may be secured in the mentioned two-cell or two-film arrangement, by rapid manual manipulation of one or of both, of the sources such as S2 and S4 or manipulation of their respective controls. Further, variations in primary-radiation absorbancy may be effected by utilizing different solvents in which basic MC material is dissolved in the formation of a solid solution of MC material, it being known that the "color" and hence the absorbance-band of some MC materials depends upon the solvent employed for dispersing the MC material in a cell or film-forming material.

The versatility of the invention is further extended by utilization of the technique of controlling the ambient temperature (and/or the ambient flooding illumination) to effect control of the decay time of the MC material or materials used. Where erasure (decay) is controllable by either of a particular waveband within the visible portion of the emw spectrum or by IR radiation (as in the case of some MC materials), one of the latter may be used for periodic removal of contrast-change effects while the other auxiliary radiation is used during intervening periods to produce the contrast-change effects. This can be accomplished by intermittent masking and/or pulsing of light-source means.

Figure 1B:
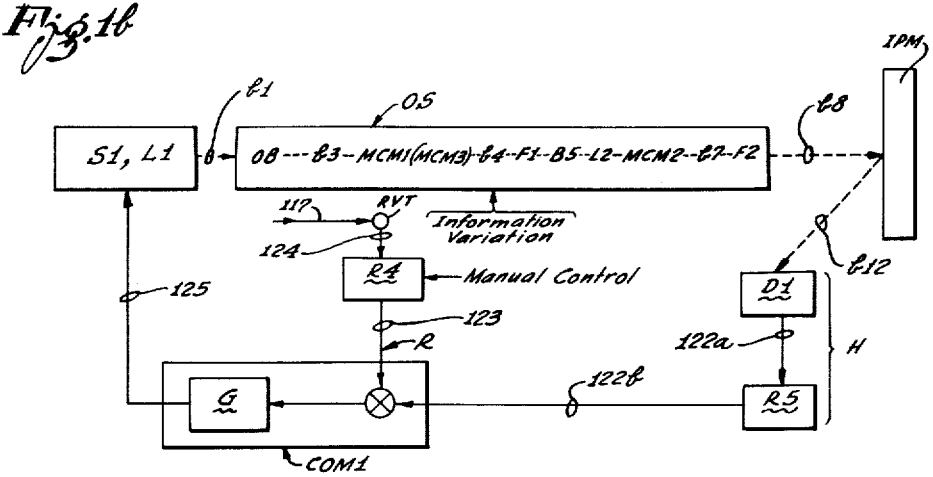
FIG. 1b is a feed-back or servo control schematic diagram illustrative of a detail of part of the exemplary apparatus shown in FIG. 1.

The fact that cascading of stages of apparatus such as that depicted in FIG. 1 can be effected is evident. In such a cascade system (not shown in detail because of complexity in drawings, but indicated at C–1, C–2 in block-diagram style in FIG. 1a), the image-plane means of the first system becomes the object for the second system. Attenuation effects, light-source intensity, and like matters become increasingly important as the number of stages cascaded increases. In such cascaded systems, phosphor screen means or other intensifying means may be employed, if appropriate, as IPM at the image plane of any or all of the stages. Also, pulsed very-high-intensity light-source means may be employed, the pulsing frequency being sufficiently high to prevent adverse visual effects in those instances where visual effects are important. Employment of some types of pulsed light-source means as source means S1 may require UV filter means as a part thereof since some such sources emit light including UV. In general, filter means, and/or aperture means, may be included in any of the light-source means.

In those cases in which very-high-intensity source means are employed and object means OB is of the nature of a photo-positive or photo-negative, it is comprehended that the base material of OB may be of quartz or other heat-resistant material, especially in those instances in which a high degree of transmissivity of UV is necessary.

In those applications of the invention wherein long-continued use of the MC material, or wherein the MC material is subjected to extremely high intensity exposure over a prolonged period, it is contemplated that the MC material may be incorporated in a movable film or the like whereby "new" portions or areas of MC material may be substituted, either at intervals or continuously at very low speeds, for fatigued portions of the material. Such film may be handled and moved in fashion similar to that used for flexible photographic film. Alternatively, the MC material may be in film form deposited upon or supported by slides or a long strip of material such as glass or quartz-plate, and moved slowly or intermittently transversely of beam b3.

The metachromatic means and materials usable in the MCM1, MCM2 and MCM3 positions in the arrangement depicted in FIG. 1 may be of several types. The MC material in solution may be encapsulated, as illustrated in a greatly magnified fragment of a film 300 comprising individual particles or micro-capsules 300a each comprising a surface shell enclosing a body of liquid comprising or consisting of MC material in solution. Encapsulation may be effected by known means and procedures, such as those disclosed in Patents Nos. 2,800,457 and 2,800,458, issued July 23, 1957, to B. K. Green, et al. and B. K. Green, respectively. The particles or capsules 300a are maintained in a coherent film-like form by suitable means, such as by a film-forming material which preferably has the same index of refraction as the capsules and MC material. If the film is so thin as to be not self-supporting, it may be enclosed or secured to a supporting means, such as to the face of a quartz-glass plate. Alternatively, as indicated in FIG. 2, the film-forming and MC material may be disposed as a film 400f between plates 400a, 400b of translucent material such as Pyrex, synthetic resin, or quartz, to form a slide-like cell. Thus the MC material may be disposed in means permitting easy movement and/or replacement. Also, as indicated in FIG. 3, the metachromatic material may be dissolved in a film-forming material which when cured or solidified as by chemical reaction or solvent loss, provides a unitary self-supporting or rigid mass or film 500 which can in instances form the active element of a metachromatic means. In general, the basic material or compound from which a MC material is made must be in solution in a suitable solvent or carrier.

One type of metachromatic means, suitable for certain applications of the invention, comprises a closed transparent cell of glass or the like containing a liquid solution of MC material. The solution may be of one part by weight of each of the following three metachromatic compounds dissolved in 97 parts by weight of diethylbenzene:

(1) 1-phenyl-3,3-dimethyl-6'-nitro-8'-methoxy-spiro(2'H-1'-benzopyran-2,2'-indoline)
(2) 7'-nitro-spiro-[xantho-10,2'(2'H-1'-benzobetanapthopyran)
(3) 3,3'-dimethyl-6'-nitro-spiro(2'H-1'-benzopyran-2,2'-benzo-thiozole)]

The metachromatic means or spatial filter thus constructed, will, when subjected to blue and UV radiation, turn dark-gray to black in color and will spontaneously revert to the substantially colorless state at room temperature (70° F.) in the absence of the activating radiation.

Another specific exemplary type of suitable MC means consists essentially of a sandwich comprising MC material disposed between sheets of quartz or glass, the MC material being in solid solution or "semi-solid" solution, and the components of the solution being one part by weight of each of the compounds named in the previous example, and a solvent consisting of chlorinated diphenyl having a chlorine content of sixty percent by weight of chlorine. Other details of this exemplary filter, and of other suitable forms, are set out in the co-pending U.S. patent application Ser. No. 827,420 hereinafter fully identified.

The metachromatic material and its carrier must be selected according to the end result desired to be attained at IPM, and in those cases where two or more different MC materials are used, they must be operationally compatible with the radiations to be absorbed and with those to be transmitted, and compatible with each other. The solution may in instances be a liquid but a solid solution is more generally employed. Compounds comprised in a family of spiropyrans exhibit acceptable metachromatism properties and characteristics and are usable as MC materials in apparatus and methods according to the invention. Exemplary suitable MC materials other than those set out hereinbelow in Table I, are disclosed and claimed in the following co-pending patent applications:

Ser. No 654,578, Berman, filed April 23, 1957 (now United States Patent No. 2,953,454)
Ser. No. 803,836, Berman, filed April 3, 1959 (abandoned in favor of continuation-in-part patent application Ser. No. 108,710, filed May 9, 1961)
Ser. No. 821,383, Berman et al., filed June 19, 1959 (now United States Patent No. 2,978,462)
Ser. No. 827,175, Berman et al., filed July 15, 1959 (now United States Patent No. 3,022,318)
Ser. No. 827,420, Berman, filed July 14, 1959
Ser. No. 827,462, Berman et al., filed July 16, 1959 (abandoned in favor of continuation-in-part patent application Ser. No. 191,431, filed May 1, 1962)
Ser. No. 827,463, Berman et al., filed July 16, 1959 (abandoned in favor of continuation-in-part patent application Ser. No. 87,534, filed February 7, 1961, and later continuation patent application Ser. No. 173,355, filed February 15, 1962)
Ser. No. 827,719, Berman et al., filed July 17, 1959 (abandoned in favor of continuation-in-part patent application Ser. No. 87,533, filed February 7, 1961, and later continuation patent application Ser. No. 173,334, filed February 15, 1962)

Film forming techniques are also set forth in those disclosures.

Pyrans exhibiting metachromatism are in general, spiropyrans. An example is 1,3,3-trimethylindolinobenzopyrylospiran, which may be hereinafter designated by the term BIPS. These may be incorporated into film-forming material and films produced therewith in accord with the disclosure contained in the aforementioned copending patent application of Elliott Berman, Ser. No. 654,578, filed April 23, 1957. In instances, the metachromatism is markedly affected by the particular solvent in which the spiropyran is dispersed, and a few of the exemplary suitable solvents are listed in Table II, it being understood that selections therefrom or from other suitable solvents must be made in accord with the specific color-change desired to be effected in the MC material, as dictated by the end result required at IPM.

*Table I*

1,3,3-trimethyl-6'-nitro-8'-allyl-spiro (2'H-1'-benzopyran-2,2'-indoline)
1,3,3-trimethyl-5,6'-dinitro-spiro (2'H-1'-benzopyran-2,2'-indoline)
1,3,3-trimethyl-7'-nitro-spiro (2'H-1'-beta-naphthopyran-2,2'-indoline)
3 - methyl - 6 - nitro-spiro-[2H-1-benzopyran-2,2'-(2'H-1'-beta-naphthopyran)]
1,3,3-trimethyl-8'-nitro-spiro (2'H-1'-benzopyran-2,2'-indoline)
1,3,3-trimethyl-6'-methoxy-8'-nitro-spiro (2'H-1'-benzopyran-2,2'-indoline)
1,3,3-trimethyl-5-methoxy-6',8' dibromo-spiro (2'H-1'-benzopyran-2,2'-indoline)
1,3,3-trimethyl-7-methoxy-7' chloro-spiro (2'H-1'-benzopyran-2,2'-indoline)
1,3,3-trimethyl-5 chloro-5' nitro-8'-methoxy-spiro (2'H-1'-benzopyran-2,2'-indoline)
1,3 - dimethyl - 3-isopropyl-6' nitro-spiro (2'H-1'-benzopyran-2,2'-indoline)
1-phenyl-3,3-dimethyl-6'-nitro-8'-methoxy-spiro (2'H-1'-benzopyran-2,2'-indoline)
7' - nitro-spiro-[xantho-10,2' (2'H-1'-benzobetanaphthopyran)]
3,3' - dimethyl - 6' - nitro-spiro (2'H-1'-benzopyran-2,2'-benzo-thiazole)
3,3' - dimethyl - 6' - nitro-spiro (2'H-1'-benzopyran-2,2'-benzo-oxazole)
1,3,3,8'-tetramethyl-5'-hydroxymethyl-spiro-[2'H-1'-pyridino [[3,4-b]] pyran]-2,2'-indoline
1,3,3-trimethyl-6'-nitro-spiro (2'H-1'-benzopyran-2,2'-indoline)
6'-nitro-8'-methoxy-1,3,3-trimethylindolinobenzopyrylospiran
6'-nitro-1,3,3-trimethylindolinobenzopyrylospiran
8'-allyl-1,3,3-trimethylindolinobenzopyrylospiran
8'-carbomethoxy-1,3,3-trimethylindolinobenzopyrylospiran
8'-methoxy-1,3,3-trimethylindolinobenzopyrylospiran
6',8'-dinitro-1,3,3-trimethylindolinobenzopyrylospiran
7'-nitro-1,3,3-trimethylindolinobenzopyrylospiran
8'-nitro-1,3,3-trimethylindolinobenzopyrylospiran
6',8'-dibromo-1,3,3-trimethylindolinobenzopyrylospiran
6'-chloro-8'-nitro-1,3,3-trimethylindolinobenzopyrylospiran
5-nitro-6'-nitro-1,3,3-trimethylindolinobenzopyrylospiran

*Table II*

Alcohol (methyl, ethyl, propyl, butyl, amyl, hexyl, heptyl, benzyl, octyl, decyl)
Hexane
Heptane
Trimethylpentane
Cyclohexane
Methylcyclohexane
Benzene
Toluene
Xylene
Diethylbenzene
Cumene
Cyclohexene
Trichlorodiphenyl
Fish Oil
Vegetable Oil As an additional typical specific example of MC means, a film is formed by solidification of a poured mixture of the following, the proportions being in terms of parts by weight:

| | |
|---|---|
| Eastman "Half-Second Butyrate #EAB-381" | 25.0 |
| Chlorinated diphenyl having 60% by weight of chlorine | 25.0 |
| Toluene | 28.0 |
| Methyl ethyl ketone | 22.0 |
| Ethanol (95%) | 5.4 |
| Butanol | 0.6 |
| 6'-nitro-8'-methoxy-BIPS (Table I) | 0.375 | and the film is mounted between thin quartz-glass sheets to form a "slide." This film exhibits high absorbancy in both excited and unexcited states to excitation in the waveband 225–250 m$\mu$; but low absorbancy unexcited and high absorbancy excited, in the waveband 550–600 m$\mu$; the ambient temperature being about 6° C. and the excitant being UV radiation.

In applications where dynamic operation is not required, or where static operation is desirable, it is evident that fixed patterns can be "written" on the information-altering material by a short (or pulsed) exposure to the proper radiation from the proper source. In this case, it might be desirable to use as MC material a non-reversible light-sensitive material such as 10-(9'-xanthylidene)-anthrone or other derivatives as listed in Table III.

*Table III*

10-(9'-xanthylidene)-anthrone
3-chloro-10-(9'-xanthylidene)-anthrone
3-methyl-10-(9'-xanthylidene)-anthrone
4'-chloro-10-(9'-xanthylidene)-anthrone
9,9'-dixanthylene
10,10'-dianthrone Having disclosed an exemplary embodiment of apparatus utilizing the principles of the invention and exemplary procedures according to the invention as performed by or with the exemplary apparatus, it is evident that changes and modifications will occur to those skilled in the art; and accordingly it is not desired to be limited to the exemplary apparatus and procedures described.

What is claimed is:

1. An optical information-processing system comprising: first means, including a light-source means, for producing an information-containing beam of light; second means, disposed in the path of said information-containing beam and including optical imaging means, for producing an optical image representative of information contained in a beam of light supplied thereto; and third means, including variable metachromatic optical-means, optically interposed between said first means and said second means and effective to variably modify said information-containing beam of light and thereby variably modify the information therein contained, said metachromatic means being characterized by point-to-point variations of the transmissivity thereof in response to a first auxiliary E.M.W. radiation, said variations being reversible in response to a second auxiliary E.M.W. radiation, said third means being constructed and arranged to transmit light of said information-containing beam as modified to said second means.

2. A system in accord with claim 1, said first means comprising collimating means for collimating light from said light source, and comprising means for introducing information into the light collimated by said collimating means.

3. A system in accord with claim 1, said third means including in said variable optical means a metachromatic means interposed in the information-containing beam of light, and including variable auxiliary-radiation source and supply means constructed and arranged to supply exciting auxiliary-radiation to the metachromatic means to vary the transmissivity of the metachromatic means with respect to the information-containing light transiting therethrough.

4. A system in accord with claim 1, said first means comprising a translucent photo-record means disposed in the light from said light-source means; and said third means including means for disposing said metachromatic means closely adjacent that face of said photo-record means opposite from the face receiving light from said light-source means.

5. A system in accord with claim 1, said first means comprising an object-means disposed in the light from said light-source means whereby the object-means imparts information to a beam of light from said light-source means; said third means comprising a plane-faced metachromatic means disposed to receive and modify the information-containing light passed by said object-means.

6. A system in accord with claim 5, said second means comprising screen-means for intercepting and displaying information imparted to light from said light-source means by said object-means and as modified by said metachromatic means.

7. A system in accord with claim 6, said screen-means comprising photosensitive optical means.

8. A system in accord with claim 1, said first means including collimating-means for collimating light from said light-source means, and further comprising a translucent photo-record means disposed transversely of and in the light collimated by said collimating-means and constructed and arranged to impart to the collimated light certain information recorded on said photo-record means.

9. A photo system adapted to produce on an image plane means an altered image of an object, such alteration being of predetermined character and of the class including change of contrast, image-outline enhancement, and clarification of detail, said system comprising: first means, including means to form a collimated beam of light of frequencies within a first waveband, and said beam containing information representative of an image of an object; second means, disposed in the path of said collimated beam of light and including metachromatic means through which said information-containing beam is caused to be transmitted; third means, so disposed as to be optically accessible to said metachromatic means and including means for producing and directing onto said metachromatic means, light of frequencies in a second waveband which waveband includes at least a major portion of frequencies not in said first waveband and which when present induces point-to-point variations of the transmissivity of said metachromatic means to alter said information containing beam of light; controllable means for regulating the intensity of the light in said second waveband supplied by said third means, to controllably regulate the variable transmissivity of said metachromatic means in regard to light in said collimated beam; and image plane means disposed in the optical path of said altered beam of light and including a device at an image plane, for producing from the light transmitted thereto the image represented by the information in said beam as altered by said metachromatic means.

10. A system according to claim 9, including as an object means, a photo-transparency having photographic information therein and imparted to said collimated beam as the latter is transmitted through the transparency.

11. A system according to claim 10, said metachromatic means comprising metachromatic material in rigid carrier means.

12. A system according to claim 10, said second means including means for adjustably positioning said metachromatic means toward and away from close juxtaposition relative to said photo-transparency.

13. A system according to claim 9, comprising means for introducing the light produced by said third means into said beam produced and formed by said first means, for transmission of that light through said transparency and said metachromatic means.

14. A system according to claim 13, including means for filtering from the light transmitted through said metachromatic means, at least a portion of the light produced by said third means.

15. A system according to claim 13, said metachromatic means comprising metachromatic material in a rigid carrier, and said second means including means for adjustably positioning said metachromatic means toward and away from close juxtaposition relative to said photo-transparency.

16. A system according to claim 14, including servo control means for sampling light produced by said third means as transmitted through said metachromatic means and for automatically controlling the intensity of light provided by said third means to maintain the intensity thereof at a predeterminable value.

17. A system according to claim 16, including in said servo control means, a means for manually adjusting the intensity of the light provided by said third means.

18. An information-altering system adapted to effect alteration in a predeterminable manner and to a controlled extent the information contained in an areal cross-section of a beam of collimated light, said information being optically convertible into a visible image, and said alteration being of predetermined character and of the class including image-enhancement, outline-enhancement, change of contrast, and change of maximum intensity-level, said system comprising: first means including means to produce and form a collimated information-containing beam of light comprising frequencies principally within a first E.M.W. waveband, and said beam containing information representative of an optical image of a light source and an object; second means disposed in the path of said collimated beam of light and including projection means, for focusing said information-containing beam at a focal point in a focal plane and for producing an optical image from said beam at an image plane beyond said focal plane; third means so disposed as to be optically accessible to said projection means and including means for providing and introducing into said information-containing beam ahead of said projection means, light comprising frequencies restricted to a second E.M.W. waveband and comprising frequencies not included in said first E.M.W. waveband; fourth means including metachromatic means disposed at said focal plane, said metachromatic means being characterized by point-to-point variations of the transmissivity thereof in response to light of frequencies in said second E.M.W. waveband and relatively non-responsive to light of frequencies in said first E.M.W. waveband; and means for adjusting the intensity of light provided by said third means whereby to vary the degree of alteration of the information contained in said beam of collimated light.

19. A system according to claim 18, said first means including a slit source of light.

20. A system according to claim 19, said slit source of light comprising means providing light of frequencies within the visible portion of the E.M.W. spectrum.

21. A system according to claim 18, said first means including a point source of light.

22. A system according to claim 21, said point source of light comprising means providing light of frequencies within the visible portion of the E.M.W. spectrum.

23. A system according to claim 18, said third means including a source of ultraviolet E.M.W. for introduction into the information-containing beam.

24. A system according to claim 23, said fourth means including a filter means disposed beyond said metachromatic means and effective to remove from the light transmitted through said metachromatic means the ultraviolet E.M.W. introduced into the information-containing beam.

25. An optical information-processing system comprising: first means for admitting a beam of substantially parallel rays of light to provide a collimated beam of light, and including object-means for imparting information to the light of said beam; second means, disposed in the path of said collimated beam of light and constructed and arranged for translating the information contained in light supplied thereto, into useful form; and third means, including variable metachromatic optical means characterized by point-to-point variations of the transmissivity thereof in response to an auxiliary radiation and interposed between said first means and said second means, said metachromatic optical means being constructed and arranged to variably modify the information-containing beam of light issuing from said first means and to direct the modified beam of light to said third means.

26. A system according to claim 25, said third means comprising means for supplying and collimating with said collimated beam of light a beam of UV radiation; and said metachromatic means being relatively insensitive to light of said beam and relatively sensitive to UV radiation.

27. A system according to claim 26, said system including feed-back means sensitive to information-containing light directed to said second means, and effective to regulate said first means to maintain at a desired intensity level the light directed to said second means.

28. A system according to claim 25, including projection-lens means for focusing information-containing light from said first means in a focal plane and directing the light to said second means, and including metachromatic means disposed in the said focal plane.

29. An optical information-modification system, adapted to automatically perform variable spatial-filtering upon optical information supplied to the system in the form of light diffracted according to a given pattern representing said information, said system comprising: first means, including means for providing, at a control plane beyond a given point in the system an information-containing collimated beam of light, all of which is within a selected E.M.W. waveband, with the information therein reducible to an optical image; second means, disposed in the path of said collimated beam and including first metachromatic means having metachromatic material substantially uniformly disposed transversely of said beam and variably transmitting light of said beam in consequence of variations in optical absorptivity of the metachromatic means; third means, so disposed as to be optically accessible to said metachromatic means and including variable light-source means effective to produce and project onto said metachromatic material light including some light not within said selected waveband, said metachromatic material being characterized by point-to-point variations of the optical absorptivity thereof in response to said light not within said selected waveband, said third means including variable means effective upon variation thereof to vary the intensity of the said light not within said selected waveband; fourth means, disposed in the path of the light transmitted through said metachromatic material and including projection means having a focal plane, and image-plane means, effective to utilize light transmitted through said metachromatic material and to focus directly-transmitted light at a point in said focal plane and to produce an optical image containing the information comprised in said beam of light, as modified by said metachromatic material; fifth means, including second metachromatic means disposed in said focal plane, effectively functioning to selectively and variably suppress regions of the spatially distributed diffracted light pattern transmitted through said second metachromatic means to said image-plane means; and means including means to vary said variable means whereby to modify the information contained in said collimated beam of diffracted light.

30. A system according to claim 29, said means to vary said variable means comprising: sampling means to sample the light from said variable light-source means, and servo means responsive to said sampling means and effective to vary said variable means to maintain substantially constant the intensity of the light projected on said metachromatic means by said third means.

31. A system according to claim 30, said first means including as a light source for said beam, a slit source providing diffracted light.

32. A system according to claim 29, including means to sample the intensity of at least a significant portion of the optical image formed by said fourth means, and to control the intensity of the light provided by said first means inversely according to variations of light at said image-plane means.

33. An information-processing system, comprising: first means, including means effective to provide a beam of light and means to supply information to the beam to form an information-containing light beam; second means, disposed in the path of said information-containing light beam and including means constructed and arranged to receive and translate said information-containing beam of light into an optical representation of the information contained in the beam of light; third means, including metachromatic means characterized by point-to-point variations of the transmissivity thereof in response to an auxiliary radiation, said third means being interposed in the information-containing light beam between said first means and said second means and effective to variably alter the information-content of that light beam and to direct the light thereof as altered to said second means.

34. A system according to claim 33, said first means including a photo-negative interposed in the provided beam of light, and said third means comprising metachromatic film-means adjacent said photo-negative and arranged to transmit at least some of the information-containing light beam, and including means to alter the transmissivity of the metachromatic means.

35. A system according to claim 33, said third means comprising a second metachromatic means interposed in the information-containing beam of light altered by the first named metachromatic means, and including means for activating said second metachromatic means.

36. A system according to claim 33, said first means comprising a first light source means, a first lens means, and an object means; said second means comprising a second lens means, a focal plane means, and an image plane means for translating the information in the light beam directed thereto into usable form; and said third means comprising as part of said metachromatic means some excitable metachromatic material disposed to transmit light of said information-containing beam and said third means also comprising means for variably exciting the metachromatic material.

37. A system according to claim 36, comprising in each of said first means and said second means, respective variable support means for said first lens means and said second lens means.

38. A system according to claim 36, said third means comprising light-source means constructed and arranged to furnish light for variably exciting the metachromatic means, and filter means for removing undesired exciting light transmitted by the metachromatic means.

39. An information processing system comprising: first means providing a beam of light, second means constructed and arranged to receive and translate said beam into an optical representation, and third and fourth means interposed in the path of said beam between said first and second means for effecting respective interrelated areal variations of said beam, at least one of said third and fourth means including metachromatic means characterized by point-to-point variations of the transmissivity thereof in response to an auxiliary radiation.

40. An information processing system comprising: first means providing a beam of light, second means for receiving and translating said beam into useful form, and third and fourth means interposed in the path of said beam between said first and second means each effecting an areal variation in said beam, the areal variation effected by one of said third and fourth means over at least one incremental cross-sectional area of the beam having a predetermined relation with respect to the areal variation effected by the other, at least one of said third and fourth means including metachromatic means characterized by point-to-point variations of the transmissivity thereof in response to an auxiliary radiation.

41. The invention in accordance with claim 40, wherein said predetermined relation is such that the areal variation produced by one of said third and fourth means is in direct proportion to the areal variation produced by the other over at least one incremental cross-sectional area of said beam.

42. The invention in accordance with claim 40, wherein said predetermined relation is such that the areal variation produced by one of said third and fourth means is in inverse proportion to the areal variation produced by the other over any incremental cross-sectional area of said beam.

43. An information-processing system comprising, in combination: first means, comprising means providing an information-containing light beam in which information is represented by areal distribution of light intensity in incremental cross-sectional areas of the beam; second means, disposed in the path of said information containing light beam and comprising image-plane means for translating information in said light beam directed thereon into usable form, and comprising lens means for projecting light of said light beam onto the image-plane means, said lens means acting to focus collimated light at a focal point in a focal plane intermediate the lens means and the image-plane means, and said second means including optical spatial filter means disposed in said focal plane to selectively filter out segments of the areally distributed light intensity pattern; and third means, comprising optical means interposed between said first means and said second means, to selectively filter out segments of the areally distributed light intensity pattern, said optical means being constructed and arranged for transmission of the information-containing light to said second means.

44. A system according to claim 43, said optical means comprised in said third means comprising a translucent film comprising metachromatic material in solid solution.

45. A system according to claim 43, said spatial filter means comprised in said second means comprising a translucent film containing metachromatic material.

46. A system according to claim 43, in which system the optical means comprised in said third means comprises metachromatic material disposed in a plane generally transverse of the beam of light provided by said first means; and means for variably exciting the metachromatic material to vary the optical filtering effects thereof.

47. A system according to claim 43, including means comprising feed-back control means for controlling the filtering effect of the optical means of said third means to selectively maintain the filtering effect substantially constant in a temporal sense.

48. An information-processing system comprising, in combination: first means, including a first light-source means and a first lens means, for providing a collimated beam of light, and including object means constructed and arranged to impart information to said beam of light; second means, including image-plane means and projection lens means disposed in the course of said beam of light and constructed and arranged to refract light of said beam to a focus in a focal plane between said projection means and the image-plane means and produce an optical image at said image-plane means; third means, including metachromatic optical means disposed in the information-containing light beam beyond said object means, said metachromatic optical means being characterized by point-to-point variations of the transmissivity thereof and constructed and arranged to variably alter the spatial distribution of the light intensity pattern representing the information contained in said beam; and feed-back control means including means for controlling the light from said first light-source means and including means connected to said first light-source means and responsive to the illuminance at said image-plane means, to regulate the intensity of light provided by said first light-source means to maintain substantially constant the illuminance over a selected area at said image-plane means.

49. A system according to claim 48, said object-means comprising a photo-negative interposed in the course of the collimated beam of light, and said third means comprising means for furnishing auxiliary excitant radiation for the metachromatic optical means, and said third means comprising feed-back control means responsive to the intensity of the furnished auxiliary excitant radiation and constructed and arranged to maintain the intensity of the furnished auxiliary excitant radiation substantially constant.

References Cited in the file of this patent
UNITED STATES PATENTS

| | | |
|---|---|---|
| 2,186,942 | Vierling | Jan. 16, 1940 |
| 2,330,171 | Rosenthal | Sept. 21, 1943 |
| 2,335,659 | Fraenckel et al. | Nov. 30, 1943 |
| 2,515,263 | Raibourn | July 18, 1950 |
| 2,701,196 | Conrad | Feb. 1, 1955 |
| 2,710,274 | Kuehl | June 7, 1955 |
| 2,842,025 | Craig | July 8, 1958 |
| 2,895,892 | Chalkley | July 21, 1959 |
| 2,988,978 | Craig | June 20, 1961 |

UNITED STATES PATENT OFFICE
CERTIFICATE OF CORRECTION

Patent No. 3,085,469                                          April 16, 1963

Carl O. Carlson

It is hereby certified that error appears in the above numbered patent requiring correction and that the said Letters Patent should read as corrected below.

Column 1, line 42, for "of" read -- such --; column 2, line 22, for "plate" read -- plane --; column 6, line 58, for "said" read -- and --; column 12, line 43, for "transmisison" read -- transmission --; column 13, line 73, for "basiu" read -- basic --.

Signed and sealed this 29th day of October 1963.

(SEAL)
Attest:

ERNEST W. SWIDER                                             EDWIN L. REYNOLDS

Attesting Officer                                        Acting Commissioner of Patents